(12) United States Patent
Au et al.

(10) Patent No.: US 7,120,696 B1
(45) Date of Patent: Oct. 10, 2006

(54) CRYPTOGRAPHIC COMMUNICATIONS USING PSEUDO-RANDOMLY GENERATED CRYPTOGRAPHY KEYS

(75) Inventors: Derek C. Au, Huntington Beach, CA (US); Hugo Fruehauf, Laguna Niguel, CA (US)

(73) Assignee: StealthKey, Inc., Anaheim, CA (US)

( * ) Notice: Subject to any disclaimer, the term of this patent is extended or adjusted under 35 U.S.C. 154(b) by 0 days.

(21) Appl. No.: 09/574,345

(22) Filed: May 19, 2000

(51) Int. Cl.
*G06F 15/16* (2006.01)

(52) U.S. Cl. .................. 709/229; 380/46; 380/47; 380/44; 380/260; 380/28; 713/400; 709/248; 708/254

(58) Field of Classification Search ............... 380/46, 380/47, 44, 260, 28; 709/229, 248
See application file for complete search history.

(56) References Cited

U.S. PATENT DOCUMENTS

| | | | |
|---|---|---|---|
| 4,634,808 A | | 1/1987 | Moerder |
| 4,809,327 A | | 2/1989 | Shima |
| 4,864,615 A | | 9/1989 | Bennett et al. |
| 5,060,266 A | * | 10/1991 | Dent ............... 380/274 |
| 5,115,467 A | | 5/1992 | Esserman et al. |
| 5,345,508 A | * | 9/1994 | Lynn et al. ............ 380/46 |
| 5,412,730 A | * | 5/1995 | Jones ............... 380/46 |
| 5,519,778 A | | 5/1996 | Leighton |
| 5,590,200 A | | 12/1996 | Nachman |
| 5,748,734 A | | 5/1998 | Mizikovsky |
| 5,764,771 A | | 6/1998 | DeVito et al. |
| 5,787,172 A | | 7/1998 | Arnold |
| 5,802,175 A | | 9/1998 | Kara |
| 6,044,388 A | * | 3/2000 | DeBellis et al. ......... 708/254 |
| 6,084,969 A | | 7/2000 | Wright |
| 6,191,701 B1 | | 2/2001 | Bruwer |
| 6,292,896 B1 | * | 9/2001 | Guski et al. ............ 713/169 |
| 6,463,155 B1 | | 10/2002 | Akiyama |
| 6,748,082 B1 | | 6/2004 | Vieweg |
| 6,754,345 B1 | * | 6/2004 | Ishimoto et al. ........ 380/46 |
| 6,788,788 B1 | | 9/2004 | Kasahara |
| 6,915,434 B1 | | 7/2005 | Kuroda |

OTHER PUBLICATIONS

Shaheen, K.M., "Code book Cipher System", Proceedings of the Annual International Carnahan Conference on Security Technology, Albuquerque, Oct. 12-14, 1994, IEEE, vol. Conf. 28, pp. 66-71.
Schneier, B. "Applied Cryptography, Protocols, Algorithms and Source Code in C, Second Edition", Applied Cryptography, Protocols, Algorithms, and Source Code in C, John Wiley & Sons, 1996, pp. 419-423, 176, 177.

* cited by examiner

*Primary Examiner*—Jeffrey Pwu
*Assistant Examiner*—Kyung Hye Shin
(74) *Attorney, Agent, or Firm*—Morrison & Foerster LLP

(57) ABSTRACT

An apparatus and method for generating pseudo-random cryptographic keys in a cryptographic communications system, whereby, given a common set of initializing configuration data, the pseudo-random cryptographic keys can be duplicatively generated by various independent pseudo-random key generators of the cryptographic communications system. In accordance with the preferred embodiment of the present invention, users of the communications system can each possess an independent pseudo-random key generator to securely communicate with other users also holding independent pseudo-random key generator that share the same initialization configuration data, no matter where the other users are located or whether the users are connected via wire or wireless communication network. The present invention facilitates secure communication without the need to transport decryption keys in advanced, thereby reducing the risk of the secure communication becoming compromised via interception of decryption keys.

15 Claims, 5 Drawing Sheets

CRYPTOGRAPHIC COMMUNICATIONS USING PSEUDO-RANDOMLY GENERATED CRYPTOGRAPHY KEYS

BACKGROUND OF THE INVENTION

1. Field of the Invention

The present invention relates to an apparatus and method for a pseudo-random cryptography key generator ("PKG") in a cryptographic communication system. The present invention is especially useful in applications or systems in which cryptographic algorithms are used to secure data communications and transmissions.

2. Description of the Background Art

Currently, information being transmitted through electronic media are generally not secure and are vulnerable to interception by a third party. For example, a telephone conversation between two people over public telephone wires may be "tapped" by a third party. In another instance, an e-mail transmitted over the internet can be "intercepted" by an unknown entity, who may later use the information contained in the e-mail to the detriment of the author and/or recipient of the e-mail. Accordingly, information intended to be confidential should either be transmitted through a secure communication channel, or be transmitted in a format such that, even if the information is intercepted by an unauthorized party, the information is unintelligible to the unauthorized party.

A conventional method of maintaining the confidentiality of communication involves the use of cryptographic algorithms that encrypt and decrypt the information being communicated. The encryption process, typically involving the use of a cryptographic algorithm, makes the information transmitted through a channel undecodable or undecipherable to unintended recipients. In order to decipher the encrypted information, a recipient must possess a unique piece of information (i.e., a "key") that can be used with the cryptographic algorithms to successfully decrypt the encrypted message. More specifically, an encryption key is typically a data string which, when combined with another set of data according to an algorithm, produces a data output that is unintelligible to third parties. To decipher the data output, one must use a decryption key that can be used to decrypt the encrypted data. In many instances, the encryption key is identical to the decryption key for a given algorithm.

In a conventional cryptographic communication system based on the use of keys, the appropriate keys must be distributed to the sender as well as the receiver before secure transmission can occur. Operations and services related to the use and distribution of keys within a cryptographic communication system are commonly referred to as key management. More specifically, a key management infrastructure creates, distributes, authenticates/certifies, and often changes and/or revokes the encryption/decryption keys used within a particular cryptographic communication system. Key management can be accomplished either manually or by using automated computer programs. It is intended in a conventional cryptographic communication system that only the authorized recipient, being in possession of the appropriate decryption key, will be able to decipher the encrypted data that is sent. Accordingly, to maintain the security of a cryptographic communication system, an effective key management infrastructure must prevent unintended recipients from acquiring knowledge of the encryption and/or decryption keys in order to ensure that unauthorized parties cannot decipher the information being transmitted.

As previously discussed, in a conventional cryptographic communication system, the appropriate keys must first be distributed for use by the sender and the receiver before any cryptographic communication can take place. In many instances, keys must be distributed to multiple receivers. The process of key distribution may result in either unintentional disclosure of the keys to third parties or interception of the keys by other entities. Furthermore, a conventional cryptographic system that does not change keys on a frequent basis may eventually become vulnerable to computer "hackers," who, given sufficient time, can use powerful computers to decipher the encryption algorithm and derive the encryption keys. Thus, periodic key changes are intended to enhance security, but they also burden conventional key management systems and can jeopardize security through risk of exposure during the key distribution process.

To decrease the likelihood of someone deciphering the encrypted information, designers of conventional encryption systems typically enhance security protection by using stronger encryption algorithms that are based on longer encryption codes, changing keys on a more frequent basis, and/or implementing a more sophisticated key management infrastructure. Nevertheless, even an enhanced cryptographic communication system is susceptible to a breach by a hacker, especially in today's world of powerful computers. Furthermore, changing keys on a more frequent basis creates additional opportunities for the keys to be disclosed or intercepted by unauthorized parties. Finally, complex key management infrastructures that change and distribute keys on a frequent basis increase logistics and the cost of maintaining a cryptographic communication system.

SUMMARY OF THE INVENTION

The present invention enhances significantly the security of cryptographic communication systems by applying an innovative alternative to conventional methods of key management. In particular, the present invention facilitates a communications infrastructure within which communication transmissions are secured using pseudo-randomly generated encryption and decryption keys. More specifically, preferred embodiments of the present invention provide pseudo-random key generators ("PKG") that can be deployed into a secured communication system, substantially eliminating any need of key distribution and capable of keeping the keys unknown to some or all parties involved. In particular, a pseudo-random key generator according to a preferred embodiment of the present invention generates a set of key sequences based on a pseudo-random method such that, for any given period of time, the pseudo-random key generator generates a key unique for that time period. In an alternative embodiment of the present invention, a key is generated pseudo-randomly and is unique for a particular event rather than time.

Pseudo-random numbers generated by the present invention are the result of two separate and settable inputs: an arbitrary reference "seed" value and a time or event value assigned to the arbitrary reference seed. Two or more pseudo-random number ("PRN") generators with the same PRN generating algorithms and the same two input values will produce the same PRN outputs. If these identical PRN outputs then drive the balance of otherwise identical PKGs, those PKGs will produce identical cryptographic keys to encrypt or decrypt communications by whatever encryption algorithms are employed. If two or more otherwise identical PKGs have different reference seed values or different time or event values assigned to the seed values for their PRN generators, then different cryptography keys will be generated. Thus, PRNs with such different inputs will not lead to producing identical cryptographic keys from the PKGs. Likewise, identical PRNs with identical inputs will lead to producing identical cryptographic keys from otherwise identical PKGs.

In accordance with the preferred embodiment, in a cryptographic communication community in which multiple pseudo-random key generators with identical reference seed values and identical time values assigned to the seed values are deployed to various authorized users, the generators are time synchronized and each independently generates an identical key for a given time, thereby allowing the authorized users to encrypt and decrypt data with identical keys without having to know the keys nor acquire the keys from an outside source, nor require any key or key material to be transferred by physical means or across a communications media. Further details of a cryptographic communication system employing pseudo-random key generation processes are described in patent application Ser. No. 09/510,540, titled "System and Method for Secure Cryptographic Communications," filed on Feb. 22, 2000, which is hereby incorporated by reference.

As previously mentioned, since the sequence of keys generated by the present invention is pseudo-random, the same key sequence can be generated at multiple remote sites of the authorized user community provided that the configuration and settings of the algorithms are the same and the generators are time synchronized or, as in an alternative embodiment, event synchronized. Furthermore, since the keys are generated internally at each remote location of the authorized user community, and the application of these keys are synchronized by time or some other event, a cryptographic communication system applying the present invention can successfully encrypt and decrypt communicated data without any key exchanges or key management and with the attendant advantage that the keys are unknown to anyone in the user community. Hence, the present invention substantially removes the requirement for transmitting key data or key information to remote sites or disclosing the keys, thus eliminating opportunities for keys to be disclosed to or intercepted by an unauthorized party.

Another advantage of the present invention includes the ability to change the cryptographic keys on a periodic basis in a manner transparent to the users in the authorized user community. Since keys are automatically generated at each remote site, they can be changed automatically or on command, quickly and with high frequency to enhance the strength of the cryptographic algorithm without creating additional security breach opportunities that are traditionally associated with conventional methods of key change and distribution. Frequency for key changes can range from changing keys once every fraction of a second to once over however long a period is deemed prudent, depending on the user community's desired level of security.

The present invention also includes additional setup measures within the PKG in order to prevent unintentional key disclosure and/or interception. Specifically, the preferred embodiment of this invention has at least four unique setup functions, which help to make the cryptographic system less vulnerable to compromise. These setup functions may be assigned among various parties for added security for the authorized user community. In this preferred embodiment, two of these are assigned for the manufacturer of the system to perform and two functions are performed by the users or their administrator as part of the setup for the users of the system in that authorized community. Other embodiments of this invention may use less than four unique setup functions or more than four. Additional advantages of the present invention include:

1. No key management infrastructure required since all the keys are internally generated and are unknown to the users in the authorized community;
2. No requirement of transfer of key or key information through the communications media or by any other means between users in the authorized user community;
3. Automatic event (such as time) synchronization of the key generation in the authorized user;
4. The ability to be implemented in private, closed community network applications as well as in public networks;
5. The ability to apply this invention to symmetric key based infrastructures (which use the same key for encryption and decryption) while also allowing application to asymmetric key infrastructures (which use different keys);
6. The ability to provide point-to-point and point-to-multipoint (broadcast) implementations;
7. The ability to use any standard or non-standard encryption/decryption algorithms;
8. Reducing vulnerability to compromise by using one or more unique and confidential setup functions, performed separately by one or more entities setting up the system for the authorized user community;
9. Through elimination of key transmittals and exchanges, achievement of higher data transmission rates, along with the elimination of service interruptions;
10. Alternative implementations possible in at least three embodiments: all-hardware implementations; a combination of hardware and software; and all-software implementations;
11. Built-in protection realizable against the generation of "weak" keys which can be easily "broken", despite a pseudo-random key generation process.
12. An equal distribution of probability of key selection over the available key space, resulting from the pseudo-random key generator's sequence of unique codes being longer than that of the cryptographic key being generated;
13. Confidential communications between selectable, specific subsets of users within a given user community via encrypted communications, resulting from unique and uniform key generation achieved and used only among the intended subset of users for those specific communications.

BRIEF DESCRIPTION OF THE ATTACHED DRAWINGS

Figure 4:
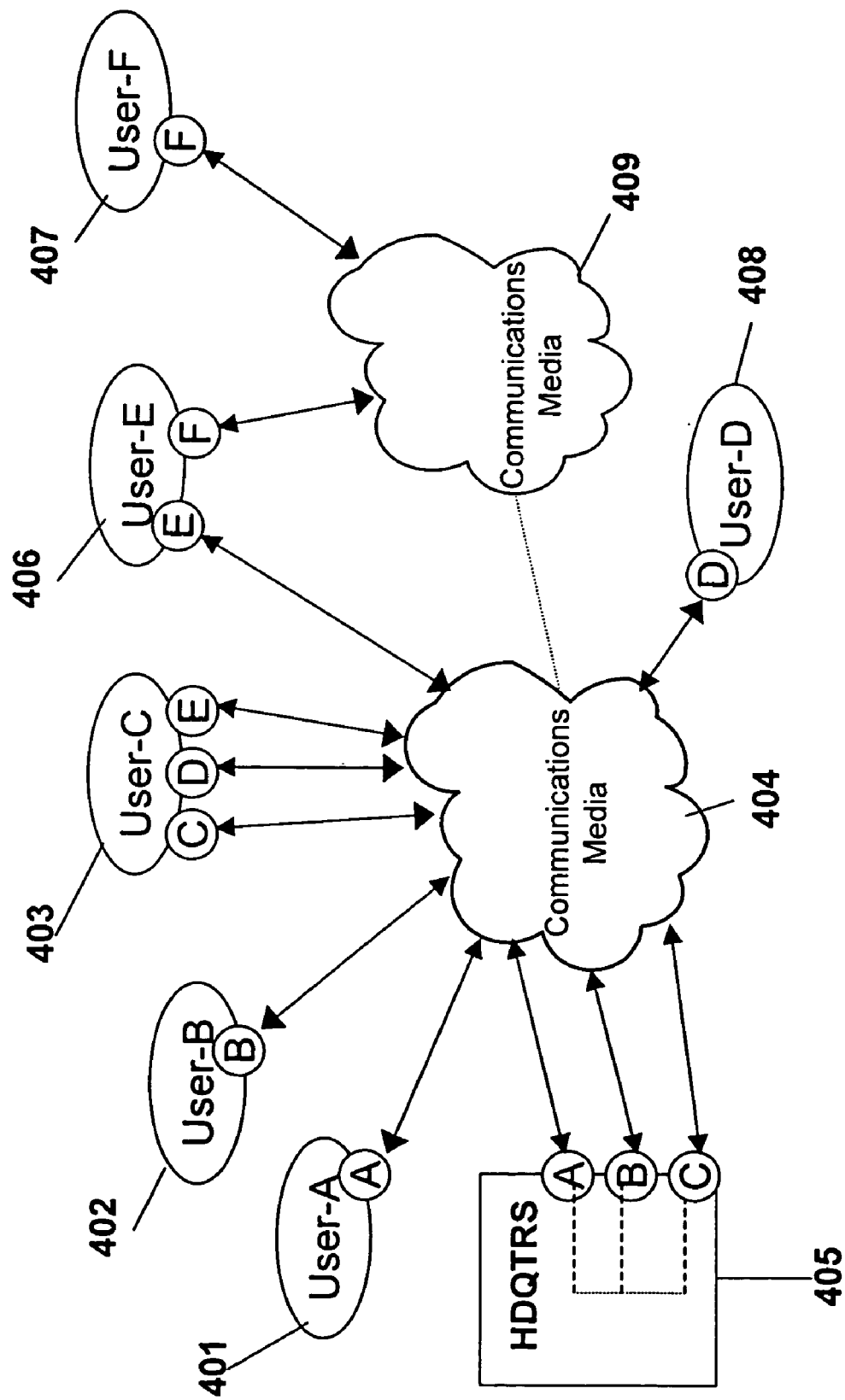
Figure 5:
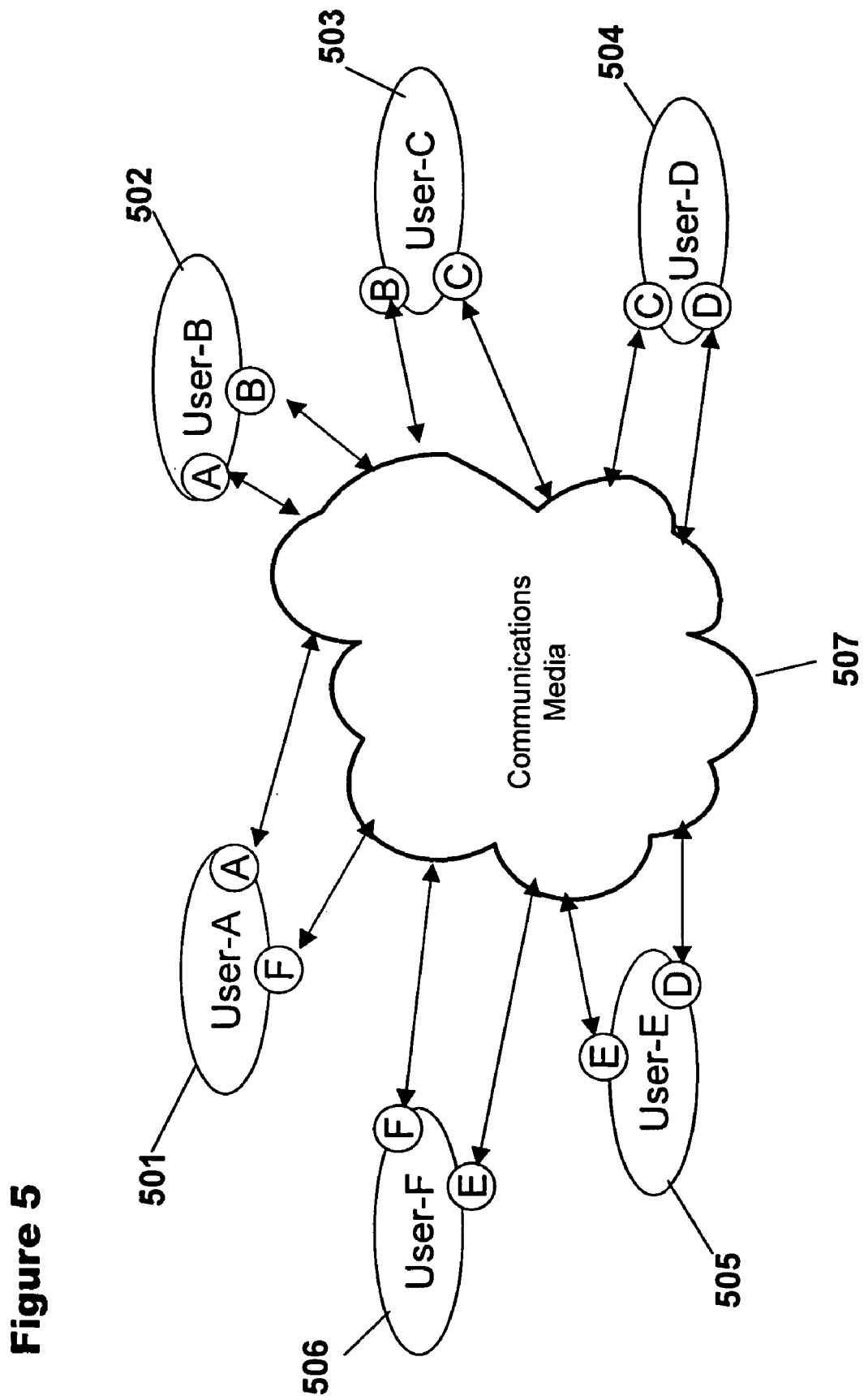

FIG. 4 is a block schematic diagram of an application illustrating multiple pseudo-random key generators deployed within an authorized user community with mixed reference seeds (some common and some individual), according to yet another embodiment of the present invention; and FIG. 5 is a block schematic diagram of an application illustrating multiple pseudo-random key generators deployed within an authorized user community with a ring hand-off combination of reference seeds, according to yet another embodiment of the present invention.

DETAILED DESCRIPTION OF PREFERRED EMBODIMENTS

Preferred embodiments of the present invention will now be described with references to FIGS. 1 through 5.

Figure 1:
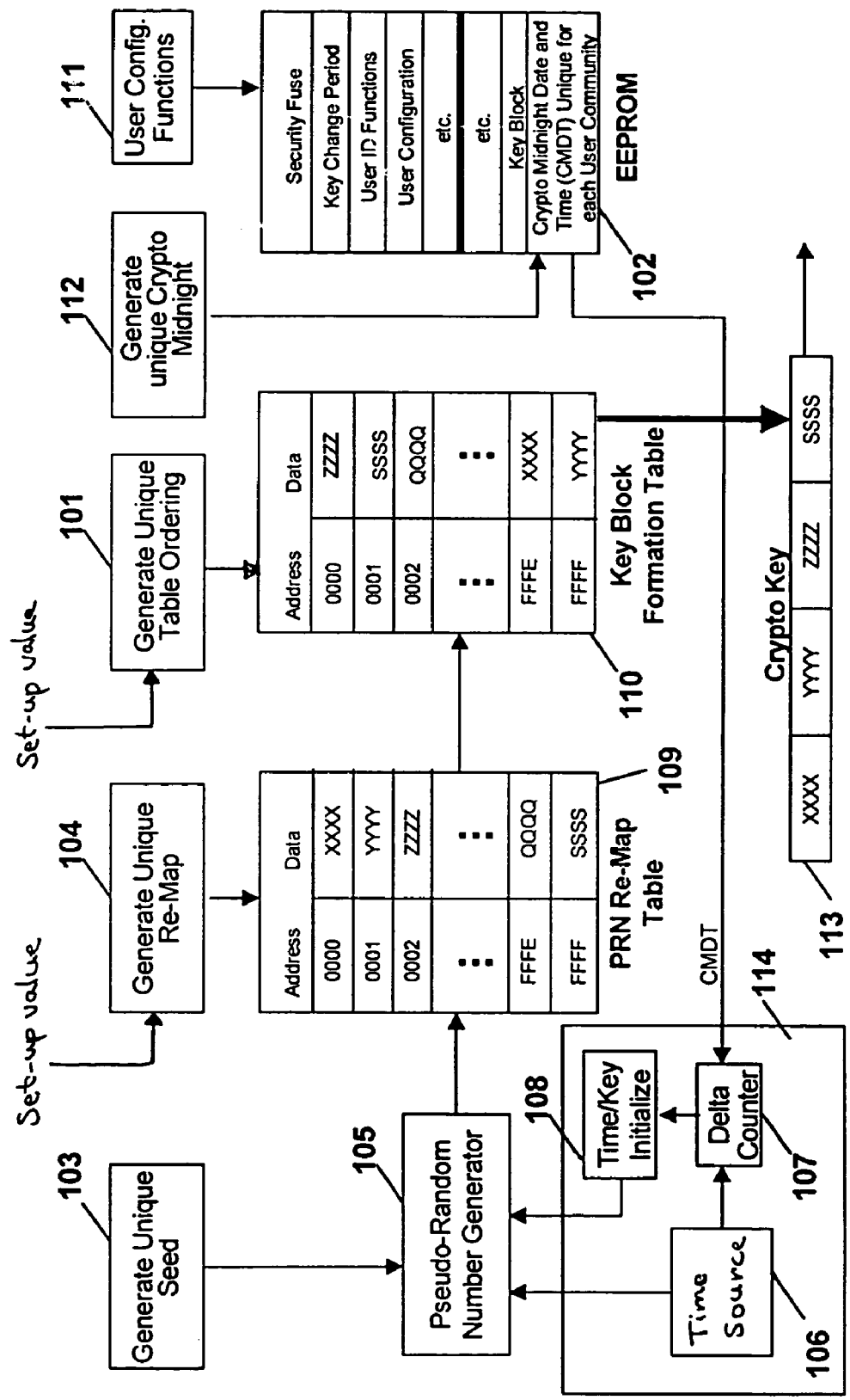
FIG. 1 is a block schematic diagram of a pseudo-random key generator according to one embodiment of the present invention.

In a cryptographic communication system for an authorized user community employing the present invention, each user preferably possesses or has access to a pseudo-random key generator like the one described in FIG. 1.

FIG. 1 shows a schematic block diagram of a pseudo-random key generator according to one embodiment of the present invention. Referring to FIG. 1, the basic components of the pseudo-random key generator include a pseudo-random number ("PRN") generator 105, a PRN re-map table 109, a key block formation table 110, a memory device 102 that is preferably an electrically erasable programmable read-only memory ("EEPROM"), and a timing circuit 114 that preferably includes a time source 106, a delta counter 107 and a time/key initialize device 108. It is to be noted that the all-hardware implementation shown in FIG. 1 can be replicated in all its functionality with mixed hardware-software or all-software implementations.

In accordance with a preferred embodiment of the present invention, the process of generating pseudo-random cryptographic keys is based on inputs from multiple sets of configuration data intended to further enhance the overall security of the encryption system. Specifically, FIG. 1 shows four sets of input configuration data being used to define and generate the pseudo-random cryptographic keys. It should be noted that other embodiments can use a greater or lesser number of input configuration data sets. In accordance with the preferred embodiments, the four sets of input configuration data include the following:

1. A seed value 103 that initializes the pseudo-random number ("PRN") generator 105;
2. Data for the PRN re-map table 109, or set-up inputs to a re-map generator 104 to cause the generation of such data;
3. Data for the key block generation table 110, or set-up inputs to a key block value generator 101 to cause the generation of such data; and
4. A "crypto-midnight" value 112, preferably embedded in the memory device 102. This is used in the process of initializing the PRN generator 105 to a specified time or event.

In accordance with the preferred embodiment, all of the input configuration data described above are preferably used in order to generate and duplicate the key sequence of the systems deployed in the authorized user community. Moreover, since each set of configuration data can be independently entered, the manufacturer and/or the users in the authorized user community can separate the acts of entering the separate sets of data and distribute the tasks over several different individuals or entities. This process ensures that no single holder of a single set of configuration data can compromise the system either inadvertently or purposefully.

In accordance with other embodiments of the present invention, the configuration data for the system can include multiple re-mapping or key blocking tables, or multiple re-mapping or key blocking value generators, or multiple pseudo-random number generators. Other embodiments may have more or less of the described setup functions, all dependent on the desired security level of the system.

According to the preferred embodiment of the present invention, the pseudo-random key generation process may be initiated by a user or users in the authorized user community via two non-collaborative steps. First, a random, unique "seed" 103 is introduced into the PRN generator 105, which is then enabled to generate numerical data strings, preferably starting at the seed value introduced. Second, a PRN re-map table 109 is either pre-loaded with table values or a table is generated by a table generator 104 in accordance with a selected algorithm, based upon a set-up input value. The PRN re-map table, which can be implemented by hardware or software, preferably includes a set of data compared to a set of addresses. Alternatively, instead of using a table stored in memory or the like, re-map values can be generated on-the-fly in accordance with an appropriate algorithm (which also is preferably provided with a set-up or starting value).

The numerical strings generated by the PRN generator 105 are used to address the PRN re-map table 109. Specifically, the numerical strings generated by the PRN generator 105 are used as addresses to access and retrieve, from the PRN re-map table 109, the previously entered data residing at those addresses. Referring to FIG. 1, for example, if the PRN generator 105 generates a number 0001, then the value YYYY is retrieved from the PRN re-map table 109.

The data retrieved from the re-map table 109 are then used to map the key block table 110, whose values are determined by key block value generator 101 based upon a set-up value, in a similar manner. (An on-the-fly generator could also be employed as discussed above.) Specifically, the data retrieved from PRN re-map table 109 are used as addresses to access and retrieve new data strings from the key block formation table 110 corresponding to those addresses. The resulting values retrieved from the key block table 110 are then concatenated to build the actual cryptographic key 113. More specifically, the cryptographic key used for encryption and decryption is generated with several cycles of numbers from key block table 110, concatenated to form a complete cryptographic key 113.

The generated cryptographic keys 113 are then combined or used with source data strings via any viable cryptographic algorithm to encrypt or decrypt the source data. According to the preferred embodiment of this invention, the cryptographic communication system uses the triple Data Encryption Standard ("3DES") as the encryption algorithm. However, other embodiments of the present invention can be adapted to support any other symmetric or asymmetric encryption algorithm.

In setting data for the key block formation table 110, "weak" cryptographic keys are preferably avoided. Weak keys refer to keys that, when used to combine with source data, may produce encrypted data that may be easily decrypted without the key. Examples of weak keys may include any numerical data strings having uniform bits, such as 0000 0000 0000 0000. Weak keys may vary depending on the type of cryptographic algorithm being used. To avoid generating weak keys, it is preferable to identify weak keys for a given cryptographic algorithm to be used and exclude any such weak keys from being mapped into the key block formation table 110.

According to the preferred embodiment of the present invention, there are also factory initialization steps. As in the case of the user initializations described earlier, there are two non-collaborative initialization steps preferably performed by the manufacturer of the pseudo-random key generator prior to its deployment to the authorized user community. First, data is introduced into key block formation table 110 (or key block values are generated by generator 101), which defines the data string for each given memory address to uniquely form the key block formation table 110. Second, a factory designated unique "crypto midnight" date and time ("CMDT") 112 is assigned. The CMDT value becomes a reference time or event associated with the seed value 103 given to the PRN generator 105, which is then subsequently governed by the time source 106.

In accordance with the preferred embodiment, at equipment startup, the time source 106 compares the current date and time with the predetermined CMDT, preferably with the aid of a delta counter 107. The difference is measured and sent to a time/key initialize block 108. This time/key initialize block 108 preferably then cycles the PRN generator 105 from the CMDT associated seed value to a new value, consistent with the current time and date, or to a time tag associated with a previously received and stored message. This is needed so that all the PRN generators in the authorized user community, who share the same CMDT and seed value, generate identical cryptographic keys for a particular time or event sequence assigned. After the PRN generator 105 generates that first numerical data string, subsequent replacement numerical strings as a new basis for key generation are generated on a periodic basis in accordance to the "key change period" configured during the setup process. A reasonable key change period may typically range between fractions of a second to several weeks. The security level of the cryptographic communication system is increased with increased frequency of key change, and vice versa.

Systems configuration setup is preferably accomplished by the user/users, who input configuration functions 111 into a memory device such as the EEPROM 102. In accordance with the preferred embodiment of the present invention, the setup process preferably includes inputting user ID functions to assure only authorized individuals can use the system, other user preference configurations, and a key change period. It is preferable that the EEPROM 102 also includes an electronic security fuse, which can be activated after all the user functions and CMDT functions are configured. This will ensure that the input functions reside permanently in the EEPROM 102 and cannot be tampered with or overridden in the future.

Other embodiments can be implemented using "events" other than time so that 112 would specify a "crypto midnight" event or event value (CME) to the EEPROM 102. This would then order the reference and increment points of the PRN generator 105 in place of the timing apparatus comprising blocks 106, 107, and 108, in block 114. An event may include a manual set point known to all users or to the users' systems administrator. Other means of eliminating time synchronization might include but are not limited to embedding a key change message in the encrypted data stream communicated to an end user, use of bit or packet counts, or use of some widely available event value e.g., the closing Dow Jones Industrial average of the immediately preceding trading day as defining events.

In accordance with the preferred embodiment of the present invention, the seed is the same for all the pseudo-random key generators, which are also identical in all other key-generating respects, within a particular authorized user community and thus each PKG produces identical keys. Each separate user community will have its own unique seed, possibly other unique setup function values, or even different PKG features and algorithms.

Figure 2:
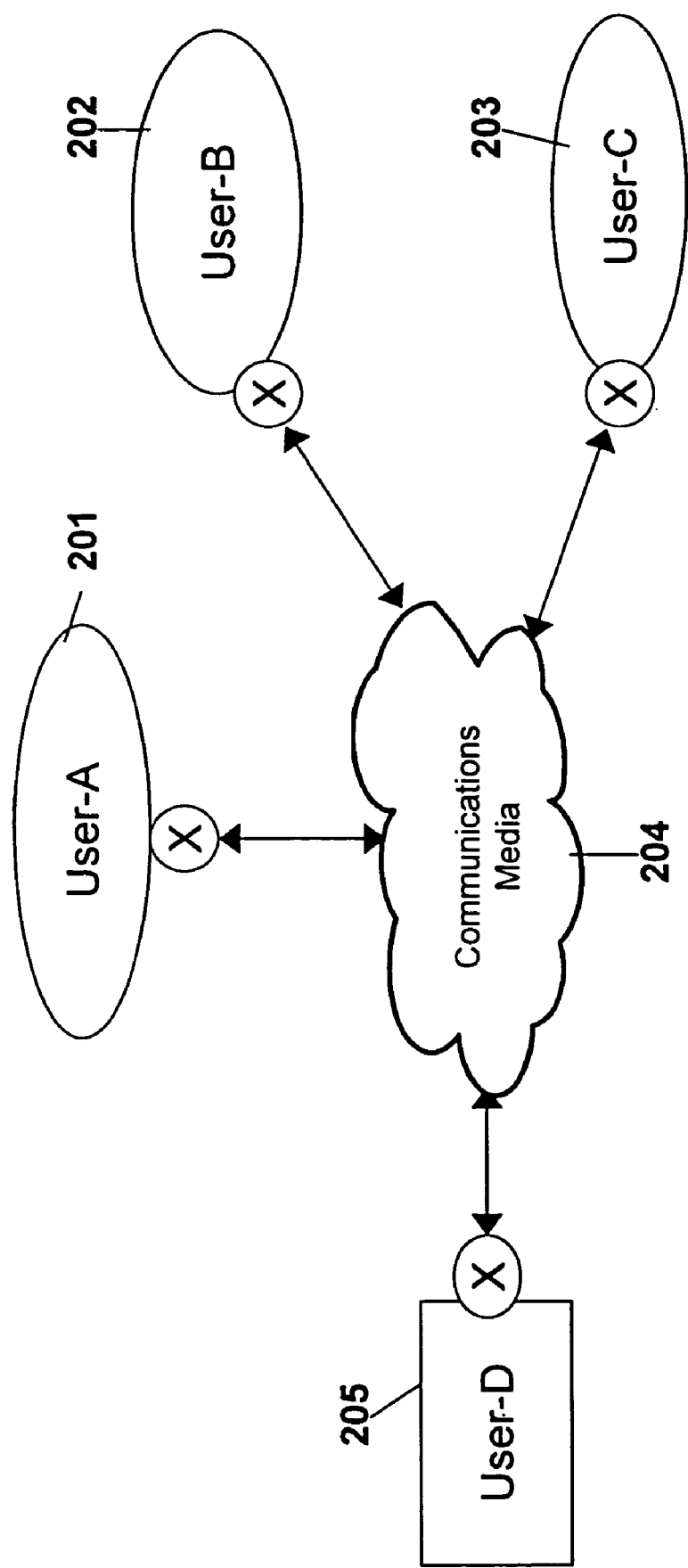
FIG. 2 is a block schematic diagram of an application illustrating multiple pseudo-random key generators deployed within an authorized user community with a common reference seed and common time or event value associated with that seed according to another embodiment of the present invention.

FIG. 2 illustrates four users within an authorized user community. Specifically, FIG. 2 illustrates users A through D (201, 202, 203 and 205) connected through a communications media 204, each user possessing an identical pseudo-random key generator with identical setup function values that is preferably time synchronized with all the others. If user A 201 wishes to transmit secured communication to user D 205, then user A 201 will encrypt its source data with a key generated by user A's pseudo-random key generator, transmit the encrypted data to user D 205 through the communications media, whereby user D 205 can decrypt the data using an identical but independently generated key. In the representation of FIG. 2, the reference seed for all the PRN generators is the same for all the users in the authorized user community.

FIG. 2, represents such a system in which the users A 201, B 202, C 203, and D 205 have a common seed ("X"), the same PRN re-map table configuration, the same key block formation table configuration, the same CMDT, and the same key change period, but of course have unique user ID, equipment ID and address configurations. All this ensures that the equipment in a particular user community generates the same cryptographic key for a specific time/event and/or time/event increments and as such, can communicate with each other directly through the communications media 204. The configuration of the communications media 204 is immaterial. As previously discussed, all these initialization and configuration functions determine how the cryptographic key is generated, thus isolating user communities with different setups.

In accordance with another embodiment of the present invention, users in the same community are given individual seeds but have PKGs identical in all other key-generating respects. This enhances the security of the system in case of compromise. In such a community, if a user's system is stolen or otherwise tampered with, the unique seed of only one user has to be revoked to secure the community rather than the common seed of many or all users as is the case for FIG. 2.

Figure 3:
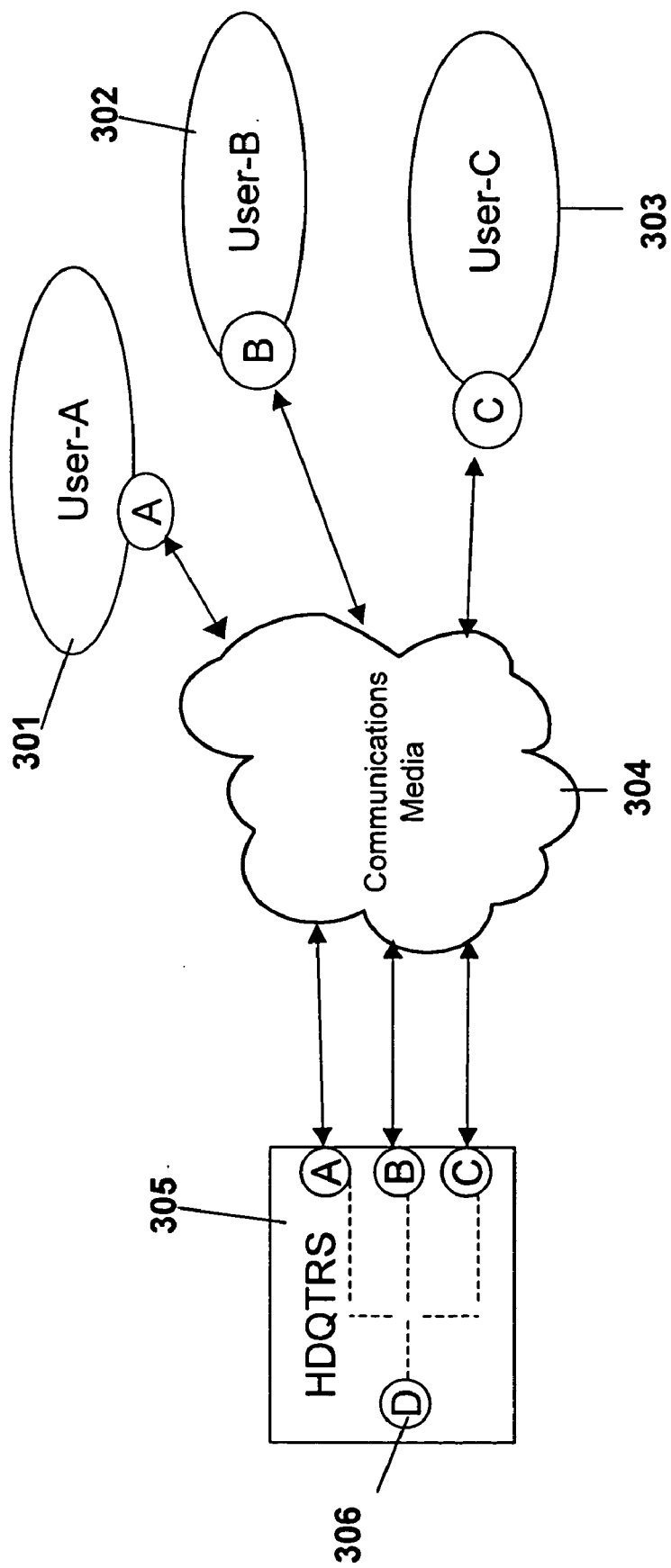
FIG. 3 is a block schematic diagram of an application illustrating multiple pseudo-random key generators deployed within an authorized user community with individual reference seeds, according to yet another embodiment of the present invention.

FIG. 3 illustrates such a scheme wherein users with individual seeds but PKGs identical in all other key-generating respects cannot communicate with each other directly but receive the required connectivity through a headquarters, which encrypts and routes the cryptographic communication accordingly. Specifically, user A 301, user B 302, and user C 303 represent separate users in the same community each being activated by a unique seed (A, B and C). Headquarters 305 represents a communication relay station having all the seeds of the users in the authorized user community. As such, user A 301 can send information to another user C 303 by first sending information through the communications media 304 to Headquarters 305, which decrypts the transmission with seed A, re-encrypts the information with seed C, and transmits the information to user C 303. In addition, an independent user D 306, preferably having a security level higher than users A, B, and C, may authorize or reject the retransmission of communications between the users in this community or to a separate community connected through 306. Again, the configuration of the communications media 304 is immaterial.

FIG. 4 illustrates a system of cryptographic communication in accordance with another embodiment of the present invention. More specifically, FIG. 4 shows users with a combination of seedings, both common and individual but the PKGs identical in all other key-generating respects. For instance, user C 403 possesses three seed, which allows the use of the communications media 404 and 409 of any configuration. Accordingly, user C 403 can communicate directly with users D 408 and E 406, using seeds D and E respectively; user C403 must go through headquarters 405 using seeds C in order to communicate with users A 401 and B 402; and user C 403 can communicate indirectly with user F 407 by first going through user E 406 with seed E. In this embodiment, certain users may be separated by multiple communications media. For example, users A 401 and F 407 are separated by two communications media 404 and 409.

FIG. 5 illustrates a cryptographic communication system in accordance with another embodiment of the present invention. More specifically, FIG. 5 illustrates a ring-like arrangement of all the users whereby each user has two seeds and acts like a relay station in the ring. One advantage of the ring configuration is that each user can communicate with any other user in the community as long as each entity is willing to be a decryption/encryption relay station. For example, users B 502 and E 505 can communicate via either F 506 and A 501 or C 503 and D 504, all using the communication media 507. Again, the configuration of the communications media 507 is immaterial. Another advantage of the ring configuration includes the ability to facilitate communication between users even if one of them is disconnected for reasons such as a security breach and/or reseeding of the pseudo-random key generator. Hence, in the FIG. 5, users B 502 and E 505 can still communicate with each other indirectly even if user F becomes disconnected.

It should be noted that the present invention may be embodied in forms other than the preferred embodiments described above without departing from the spirit or essential characteristics thereof. The preferred embodiments are therefore to be considered in all respects as illustrative and not restrictive, and all changes or alternatives that fall within the meaning and range or equivalency of the claims are intended to be embraced within. For example, although FIG. 1 shows the addresses and data of the PRN re-map table 109 and key block formation table 110 to be four bytes each, other lengths or configurations of the addresses and data would also be functional. As further example, individualization of PKGs in FIGS. 3 through 5 may be achieved through individualization of any of the other setup functions, rather than by individualization of the seed value. Also in the case in FIGS. 2 to 5, the definition of "user" can be interchanged with "community of users" with all the functionally still applicable as described. Accordingly, the scope of the invention is intended to be limited and/or defined only by the proper interpretation of the following claims.

We claim:

1. A pseudo-random key generator for use within a cryptographic communication system, said pseudo-random key generator comprising:
   a pseudo-random number generator for periodically generating a plurality of pseudo-random numbers, wherein a pseudo-random number is generated for every occurrence of a predetermined key change period;
   a computer readable storage medium connected to said pseudo-random number generator;
   a timing circuit operatively coupled to said pseudo-random number generator, said timing circuit includes a time/key initialization device and a timing source for providing current timing values,
   wherein, upon initialization of the pseudo-random key generator, said timing source compares a current timing value with a predetermined crypto midnight initialization timing value, and transmits the difference to the time/key initialization device, which causes the pseudo-random number generator to cycle through a set of initialization pseudo-random numbers starting from the crypto midnight initialization timing value until a pseudo-random number is generated in sequence for all of the key change periods between the crypto midnight initialization timing value and the current timing value.

2. The pseudo-random key generator according to claim 1, wherein said timing circuit further includes a delta counter operatively coupled to said time/key initialization device.

3. The pseudo-random key generator according to claim 1, wherein said computer readable storage medium includes a PRN re-map table.

4. The pseudo-random key generator according to claim 1, wherein said computer readable storage medium includes a PRN re-map table.

5. The pseudo-random key generator according to claim 1, further comprising a read only computer readable storage medium connected to said timing circuit.

6. The pseudo-random key generator according to claim 5, wherein said read only computer readable storage medium includes:
   the crypto midnight initialization timing value; and
   the key change period value.

7. The pseudo-random key generator according to claim 5, wherein said computer readable storage medium includes an executable program, said executable program causing said systems re-map generator to re-map the data of said PRN re-map table.

8. The pseudo-random key generator according to claim 7, wherein said system re-map generator selectively rearranges data stored in said computer readable storage medium.

9. A cryptographic communication system having a pseudo-random key generator for generating cryptographic keys, said pseudo-random key generator comprising:
   a pseudo-random number generator;
   a timing circuit operatively coupled to said pseudo-random number generator, said timing circuit providing a sequence of current timing values;
   a first computer readable storage area operatively coupled to said pseudo-random number generator, said first computer readable storage area containing a plurality of data values, each data value associated with a unique storage address within said first computer readable storage area;
   a second computer readable storage area operatively coupled to said first computer readable storage area, said second computer readable storage area containing a plurality of key data values, each key data value associated with a unique storage address within said second computer readable storage area,
   wherein the pseudo-random number generator periodically generates a pseudo-random number for every predetermined key change period, wherein each generated pseudo-random number is used to look up a unique address in the first computer readable storage area for retrieving the data value associated with the looked up unique address, and wherein the retrieved data value is used to look up a unique address in the second computer readable storage area for retrieving a key value data, said key value data being used to form a cryptographic key,
   wherein, upon initialization of the pseudo-random key generator, said timing circuit compares a current timing value with a predetermined crypto midnight initialization timing value and cause the pseudo-random number generator to cycle through a set of initialization pseudo-random numbers starting from the crypto midnight initialization timing value until a pseudo-random number is generated for all of the key change periods between the crypto midnight initialization timing value and the current timing value.

10. The cryptographic communication system according to claim 9, further comprising a programmed processor operatively coupled to said first computer readable storage area for generating the data values in accordance with a predetermined algorithm.

11. The cryptographic communication system according to claim 10, wherein said programmed processor selectively rearranges the data values in said first computer readable storage area.

12. The cryptographic communication system according to claim 9, further comprising a programmed processor operatively coupled to said second computer readable storage area for generating the key data values in accordance with a predetermined algorithm.

13. The cryptographic communication system according to claim 12, wherein said programmed processor selectively rearranges the key data values in said second readable storage area.

14. A method of generating cryptographic keys using a pseudo-random number generator, a first computer readable storage area, and a second computer readable storage area, said method comprising the steps of:

inputting into said pseudo-random number generator an initial data value;

initializing said pseudo-random number generator, said step of initialization includes steps of determining a difference between a crypto midnight initialization time value and a current time value, and causing said pseudo-random number generator to cycle through a set of initial pseudo-random numerical values;

generating a current time pseudo-random numerical value;

generating a first data string by using said generated current time pseudo-random numerical value to look up a unique memory address in the first computer readable storage area and retrieving a data value associated with the unique memory address in the first compute readable storage area, said data value being one of a plurality of data values stored in the first computer readable storage area; and generating a second data string by using said first data string to look up a unique memory address in the second computer readable storage area and retrieving a key data value associated with the unique memory address in the second compute readable storage area, said key data value being one of a plurality of key data values stored in the second computer readable storage area, wherein the retrieved key data value is used to form a cryptographic key.

15. The method according to claim 14, further comprising the steps of:

rearranging the order of the plurality of data values stored in the first computer readable storage area; and rearranging the order of the plurality of key data values stored in the second computer readable storage area.

* * * * *